US011126180B1

(12) United States Patent
Kobilarov

(10) Patent No.: US 11,126,180 B1
(45) Date of Patent: Sep. 21, 2021

(54) PREDICTING AN OCCUPANCY ASSOCIATED WITH OCCLUDED REGION

(71) Applicant: Zoox, Inc., Foster City, CA (US)

(72) Inventor: Marin Kobilarov, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 287 days.

(21) Appl. No.: 16/399,743

(22) Filed: Apr. 30, 2019

(51) Int. Cl.
*G05D 1/00* (2006.01)
*G05D 1/02* (2020.01)
*G05B 13/02* (2006.01)

(52) U.S. Cl.
CPC ....... *G05D 1/0088* (2013.01); *G05B 13/0265* (2013.01); *G05D 1/0214* (2013.01); *G05D 1/0221* (2013.01); *G05D 2201/0213* (2013.01)

(58) Field of Classification Search
CPC .. G05D 1/0088; G05D 1/0214; G05D 1/0221; G05D 2201/0213; G05B 13/0265
See application file for complete search history.

(56) References Cited

U.S. PATENT DOCUMENTS

| 2019/0064840 | A1* | 2/2019 | Becker | G05D 1/0248 |
| 2020/0004259 | A1* | 1/2020 | Gulino | G05D 1/0219 |
| 2020/0278681 | A1* | 9/2020 | Gier | G05D 1/0257 |

* cited by examiner

*Primary Examiner* — Michael D Lang
(74) *Attorney, Agent, or Firm* — Lee & Hayes, P.C.

(57) ABSTRACT

Techniques are discussed for predicting occluded regions along a trajectory in an environment, a probability of occupancy associated with the predicted occluded regions, and controlling a vehicle to minimize occlusions and/or probabilities of occupancy. A vehicle may capture sensor data. Portions of an environment may be occluded by an object and may not be represented in the sensor data, and may be referred to as occluded regions. A candidate trajectory can be received and vehicle motion can be simulated to determine predicted occluded regions associated with the candidate trajectory. Data representing a predicted environment can be input to a machine learned model that can output information associated with the predicted occluded regions, such as a probability that the region is occupied by a vehicle or a pedestrian, for example. The candidate trajectory can be evaluated based on such probabilities, and the vehicle can be controlled based on the candidate trajectory.

18 Claims, 8 Drawing Sheets

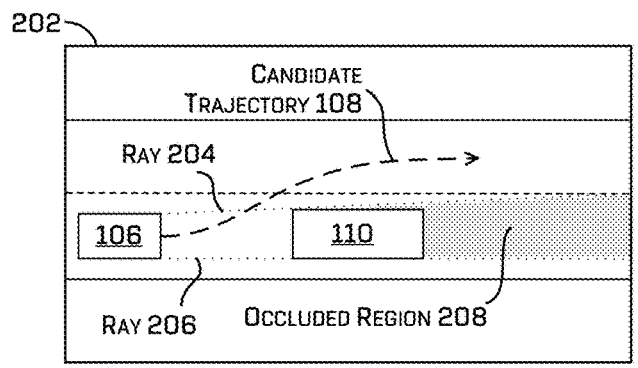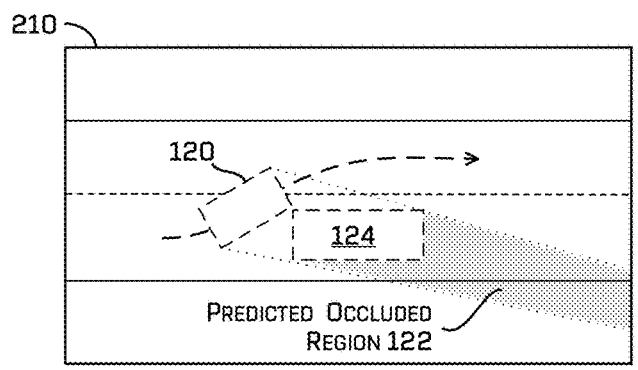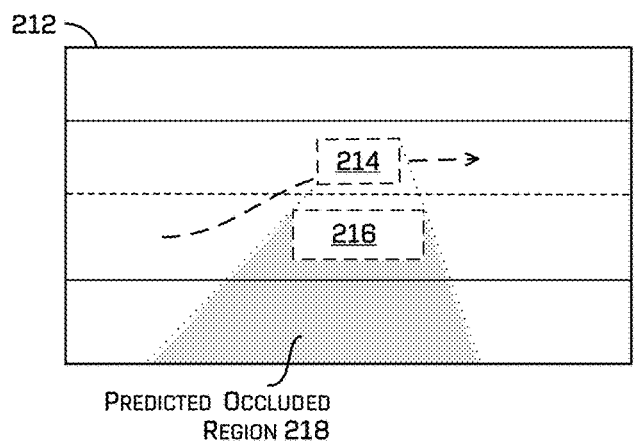
FIG. 2

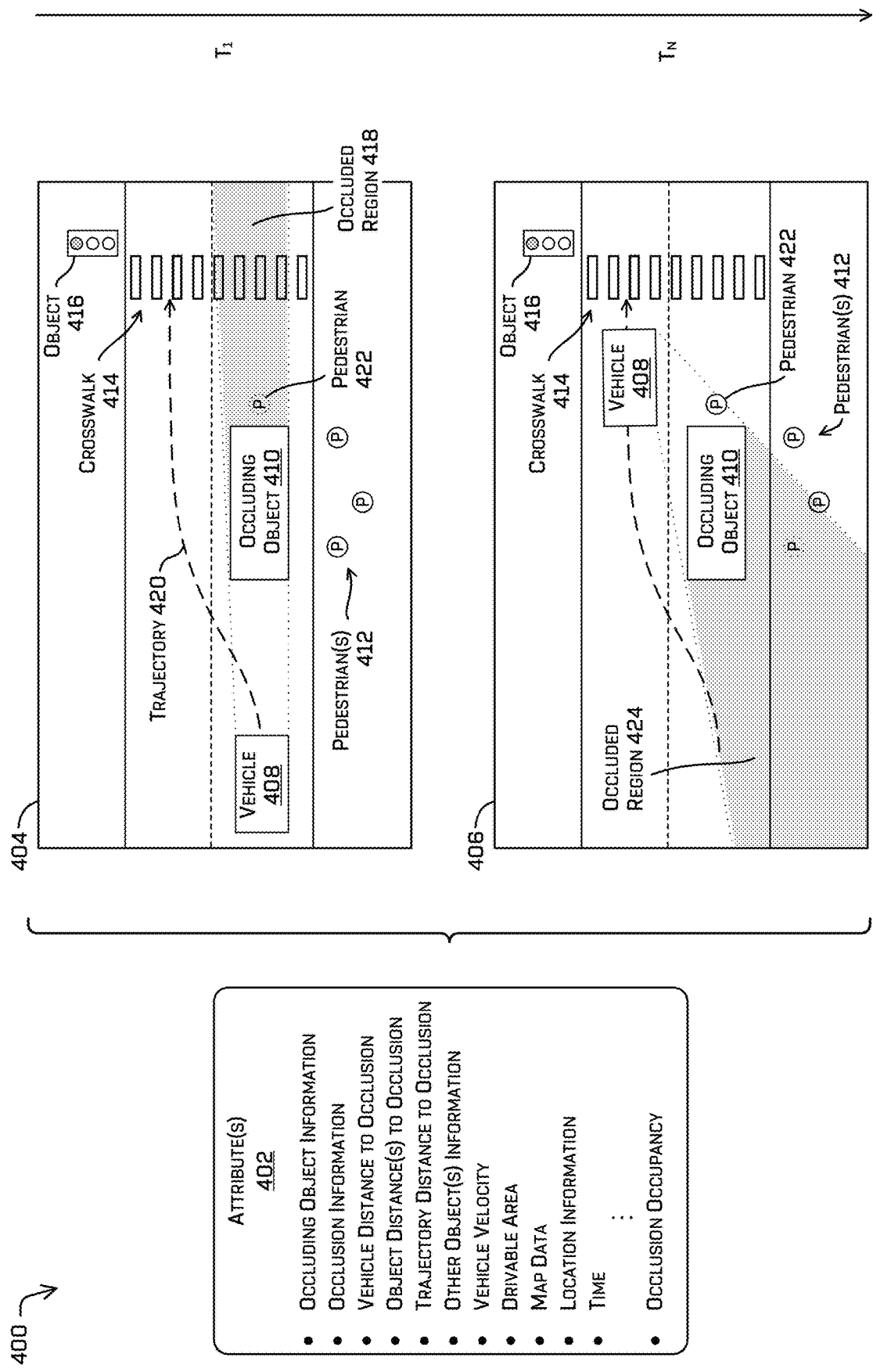

PREDICTING AN OCCUPANCY ASSOCIATED WITH OCCLUDED REGION

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may generate a plurality of potential routes for the autonomous vehicle to traverse in an environment, although selecting between such routes may present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 illustrates examples of determining occluded regions based on a candidate trajectory.

FIG. 4 illustrates examples of attributes of object(s) in an environment.

DETAILED DESCRIPTION

Figure 1:
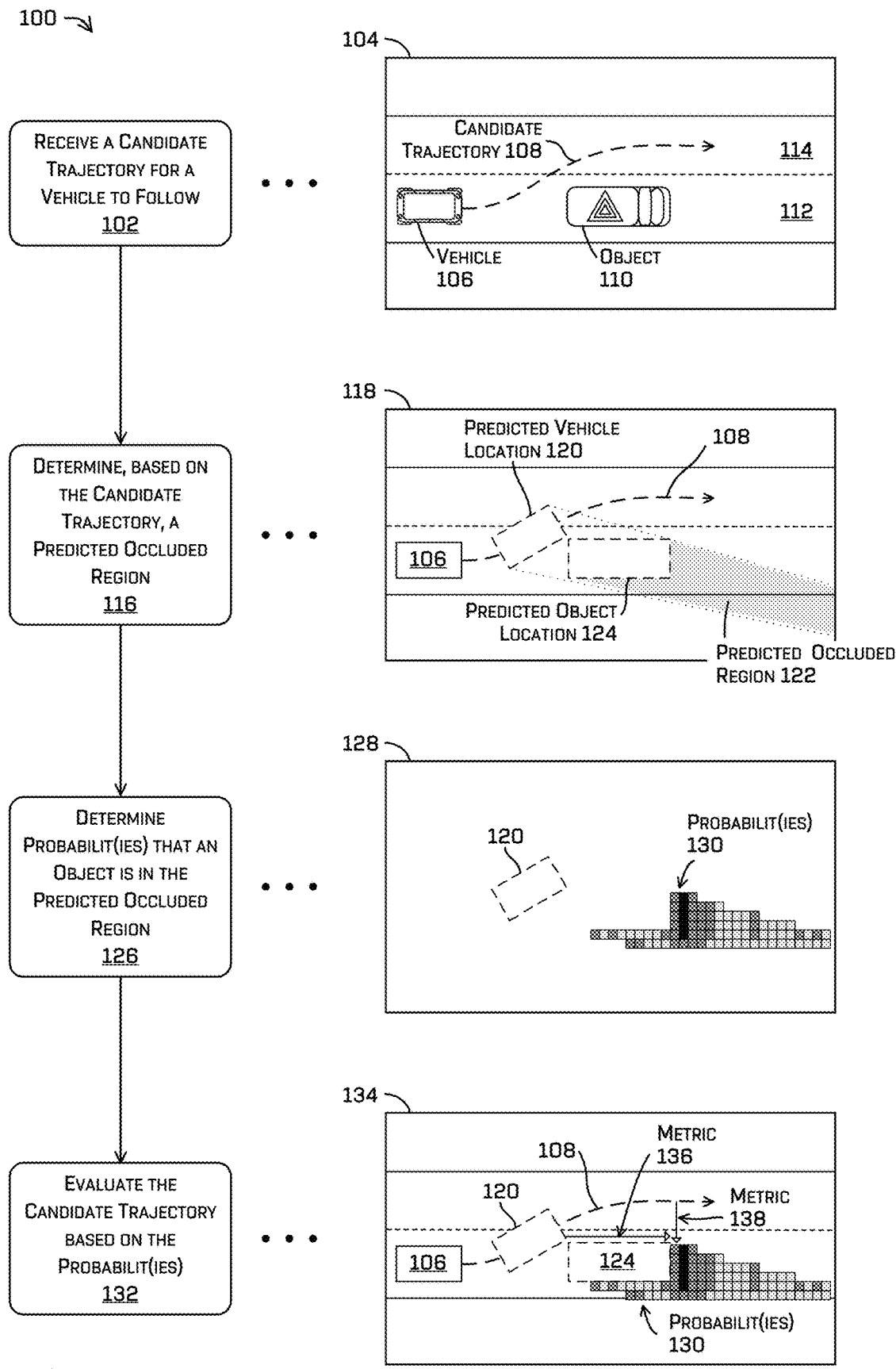
FIG. 1 is a pictorial flow diagram of an example process for receiving a candidate trajectory, determining an occluded region, determining probabilit(ies) that an object is in the occluded region, and evaluating the candidate trajectory based on the probabilit(ies).

This disclosure is directed to techniques for predicting an occupancy associated with occluded regions in an environment and planning actions based on such predictions. A vehicle, such as an autonomous vehicle, may capture sensor data representing an environment. Portions of the environment may be obscured or otherwise occluded by an object and may be referred to as occluded regions. Because of the lack of sensor data associated with an occluded region, it may be difficult to determine whether the occluded region is free of any objects or obstacles or whether the occluded region is occupied by a static obstacle or a dynamic object such as a vehicle or pedestrian. A candidate trajectory can be received and motion of the vehicle can be simulated along the candidate trajectory to determine predicted occluded regions associated with the candidate trajectory. For example, positions of the vehicle along the trajectory in the future can be determined and occluded regions can be predicted based on locations of the vehicle and object(s) to determine predicted occluded regions. Data representing a predicted environment can be input to a machine learned algorithm that can output information associated with the predicted occluded regions, such as a probability that the region is occupied by a dynamic object such as a vehicle or a pedestrian. The candidate trajectory can be evaluated based on such probabilities, and the vehicle can be controlled to traverse an environment based on the candidate trajectory.

For static objects (e.g., parked cars, buildings, etc.) the occlusion system can determine predicted occluded regions for various points along a vehicle trajectory. For dynamic objects (e.g., other vehicles in the environment), an occlusion component can receive predicted trajectories associated with the objects and can determine predicted occluded regions associated with the objects in an environment. The occlusion component can determine predicted occluded regions associated with a plurality of trajectories for the vehicle to follow in an environment.

The sensor data captured by the vehicle representing objects in the environment can be used to generate predicted occluded regions associated with the objects in the environment relative to a particular trajectory of the vehicle. For example, a prediction component can determine an occlusion grid associated with predicted occluded regions related to estimated locations of objects at future points in time. Locations of the objects can be evaluated over time to determine possible locations of the object based on the object classification, position, speed, acceleration, sensor uncertainty, and the like. Techniques such as ray casting can be used to determine which area(s) of the environment represented by the occlusion grid are occluded with respect to a location of the vehicle over time. In some examples, different techniques for determining occlusions can be used based on various sensor modalities. As a non-limiting example, ray casting may be used to determine occlusions for lidar sensors, whereas image projections using camera matrices may be used for determining occlusions of image sensors. The occlusion grid can be three-dimensional and can represent a prediction of the object in voxels that describe a volume of the object in the environment. Techniques for generating an occlusion grid can be found, for example, in U.S. patent application Ser. No. 16/011,436 titled "Occlusion Aware Planning" and filed Jun. 18, 2018, which is incorporated by reference herein in its entirety. Further, techniques for determining occluded regions and predicted occluded regions can be found, for example, in U.S. patent application Ser. No. 16/246,208 titled "Occlusion Prediction and Trajectory Evaluation" and filed Jan. 11, 2019, which is incorporated by reference herein in its entirety.

Occluded regions can be represented in the environment in a top-down representation of the environment, for example, which may comprise other sensor data captured by a vehicle. Such other sensor data captured by the vehicle can include lidar data, radar data, image data, time of flight data, sonar data, and the like. In some cases, the sensor data can be provided to a perception system configured to determine a type of an object (e.g., vehicle, pedestrian, bicycle, animal, parked car, tree, building, and the like) in the environment. Further, the perception system can determine, based on the sensor data, movement information about the object in the environment. The sensor data and any data based on the sensor data can be represented in a top-down view (e.g., a top-down image having one or more channels) of the environment.

For example, the image can represent an object as a two-dimensional bounding box representing the location of the object in the environment as well as an extent of the object (e.g., the length and width of the object), and/or a classification of the object (e.g., vehicle, pedestrian, and the like). In some examples, additional image channels may comprise velocities, accelerations, uncertainties associated therewith, and the like. Movement information such as velocity information can be represented as a velocity vector associated with the bounding box, although other representations are contemplated. In some examples, an additional image channel can comprise information associated with an occluded region, such as a size, shape, location in environment, and the like. Additionally, the image can represent, but is not limited to, one or more of: road network information (e.g., semantic labels indicating lanes, crosswalks, stop lines, lane dividers, stop signs, intersections, traffic lights, and the like); traffic light status (e.g., red light, yellow light, green light, etc.); a bounding box associated with the object, a velocity of the object in an x-direction, a y-direction, and/or a z-direction; an acceleration of the object in an x-direction and a y-direction; a blinker status of the object (e.g., left-turn, right-turn, braking, reverse, hazards, no lights, etc.); and the like.

In some examples, a top-down representation of an environment (comprising one or many channels, discussed herein), can be input to a machine learned model trained to output prediction probabilities associated with such occluded regions. In some examples, the machine learning model can output a heat map representing probabilities associated with discrete regions of an environment, such as whether those discrete regions (e.g., cells) are occupied (or are likely to be occupied) by an object such as a vehicle or a pedestrian, among other objects or obstacles.

In some examples, a candidate trajectory can be evaluated based on the probabilities associated with an occluded region or a predicted occluded region. For example, a planning component can evaluate a candidate trajectory (or simply, a trajectory) based on factors including but not limited to a size of an occluded region, a shape of an occluded region, other object(s) proximate the occluded region, a size of an occluding object, a shape of an occluding object, a velocity of a vehicle approaching an occluded region, a location in an environment, a time of day, weather, a distance between a vehicle and the occluded region, a distance between the candidate trajectory and the occluded region, the prediction probabilit(ies) associated with the occluded region(s), and the like. In some examples, a candidate trajectory can be evaluated based at least in part on a probability of a collision with one or more objects based on a predicted motion of the vehicle and/or other objects in a predicted environment.

As introduced above, data associated with the occluded region (and/or the predicted occluded region) can be input to a machine learned model trained to output prediction probabilit(ies) associated with the occluded region(s). In some examples, the machine learned model can be trained based on log data captured by vehicle(s) as the vehicle traversed an environment. In some examples, a vehicle may include sensors such as one or more lidar sensor(s), camera(s), radar(s), time-of-flight sensor(s), and the like. In some examples, the vehicle may include forward facing sensor(s) (e.g., relative to a direction of travel of the vehicle), which can be used to determine occluded regions in front of the vehicle. Further, the vehicle may also include rear facing sensor(s) (e.g., relative to a direction of travel of the vehicle) which may capture information about the previously occluded region(s) as the vehicle traverses an environment. Thus, data captured of a previously-occluded region can represent ground truth information or known information, which may verify whether an object was occupying the previously occluded region. Attribute(s) can be determined based on the log data, and the log data and/or attribute(s) can be used as training data to train a machine learning model to determine prediction probabilities. For example, the training data can be input to a machine learning model where a known result (e.g., a ground truth, such as the known "future" attributes) can be used to adjust weights and/or parameters of the machine learning model to minimize an error.

In some examples, a vehicle, such as an autonomous vehicle, can be controlled to traverse an environment based at least in part on the probabilities associated with the occluded regions. For example, such prediction probabilities can be input to a planning component of the vehicle to traverse an environment with an understanding of a likelihood that occluded regions are occupied by vehicles, pedestrians, other objects, and the like. In at least some examples, such predictions (including, but not limited to, predicted occluded regions, predicted dynamic object probabilities, and the like) may be evaluated with respect to a plurality of trajectories, such that a trajectory for controlling the vehicle can be selected based on a lowest probability of a dynamic entity being in the occluded region and/or based on a lowest probability of a collision associated with a trajectory.

The techniques discussed herein can improve a functioning of a computing device, such as a computing device of an autonomous vehicle, in a number of additional ways. In some examples, determining probabilit(ies) that an occluded region is occupied by an object can allow other vehicles or objects to better plan trajectories that ensure safe and comfortable movement through an environment. For example, if a probability associated with an occluded region indicates a high likelihood that the occluded region is occupied by a pedestrian, a vehicle controller may slow the vehicle and/or plan a trajectory to increase a distance or buffer between a planned motion of the vehicle through the environment and the occluded region. These and other improvements to the functioning of computing devices are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver controlled vehicles in which such a system may provide an indication of whether it is safe to perform various maneuvers. In another example, the techniques can be utilized in a manufacturing assembly line context, or in an aerial surveying context. Additionally, the techniques described herein can be used with real data (e.g., captured using sensor(s)), simulated data (e.g., generated by a simulator), or any combination of the two.

FIG. 1 is a pictorial flow diagram 100 of an example process for receiving a candidate trajectory, determining an occluded region, determining probabilit(ies) that an object is in the occluded region, and evaluating the candidate trajectory based on the probabilit(ies).

At operation 102, the process can include receiving a candidate trajectory for a vehicle to follow. An example 104 illustrates an environment including a vehicle receiving a candidate trajectory 108 to navigate around an object 110 in the environment. In some examples, the object 110 can represent a double-parked vehicle or a vehicle that is otherwise stopped in a lane 112 of a road. As illustrated, the candidate trajectory 108 directs the vehicle 106 to traverse out of the lane 112 into a lane 114 to traverse around the object 110.

In some examples, the operation 102 can include capturing sensor data of the environment. In some examples, the sensor data can be captured by one or more sensors on the vehicle 106 (autonomous or otherwise). For example, the sensor data can include data captured by a lidar sensor, an image sensor, a radar sensor, a time of flight sensor, a sonar sensor, and the like. In some examples, the operation 102 can include determining a classification of the object 110, a position of the object, a velocity of the object, and the like.

In some examples, the candidate trajectory 108 can represent a path in an environment for the vehicle 106 to follow. For example, the candidate trajectory 108 may be one of many trajectories to evaluate to determine an optimal trajectory for the vehicle 106 to follow. In at least some examples, the candidate trajectory 108 may be one of a plurality of candidate trajectories for the vehicle to traverse through an environment.

At operation 116, the process can include determining, based at least in part on the candidate trajectory, a predicted occluded region. An example 118 illustrates a predicted vehicle location 120 along the candidate trajectory 108. Further, the example 118 illustrates a predicted occluded region 122 associated with the predicted object location 124. In the example 118, the predicted object location 124 corresponds to the location of the object 110, as the object 110 was described as a double-parked vehicle. However, the predicted object location 124 may differ from a location of the object 110 based on a predicted location of the object 110 in the environment (e.g., based on a classification of the object, a velocity of the object, an acceleration of the object, a predicted trajectory of the object, and the like).

In some examples, the predicted occluded region 122 represents a portion of the environment which may be blocked by the predicted object location 124, thus preventing various sensors of the vehicle 106 from obtaining information about the environment. In some examples, the predicted occluded region 122 can be determined using ray casting techniques. For example, a ray can be projected from a point associated with the predicted vehicle location 120 to determine regions of the environment that are observable by one or more sensors of the vehicle 106. Regions that are not observable to one or more sensors of the vehicle 106 at the predicted vehicle location 120 can be represented as the predicted occluded region 122. In some examples, region(s) of the environment (or an occlusion grid) can be associated with metadata indicating a state of region, such as whether the region represents free space, is occupied by an object in the environment, represents an occluded region, is unknown, and the like.

Although generally depicted as being in an x-direction and a y-direction for clarity in the example 118, the predicted occluded region 122 may also represent occlusion information associated with a z-direction component, which may correspond to a height of the object 110 at the predicted object location 124, for instance. In another example, occlusion information may be associated with a z-direction component corresponding to terrain of the surrounding environment, such as hills or valleys, or height of objects that may be occluded but are relevant to trajectory determinations, such as stop lights or train crossing signals.

At operation 126, the process can include determining probabilit(ies) that an object is in the predicted occluded region. An example 128 illustrates probabilit(ies) 130, which may represent a likelihood that an object such as a static obstacle, a vehicle, a pedestrian, a bicyclist, an animal, and the like, is represented in the predicted occluded region 122. In some examples, the operation 126 can include representing the predicted occluded region 122 as a channel of a top-down image representing the environment. For example, the operation 126 can include representing the environment (or a predicted environment based on the predicted vehicle location 120, the predicted object location 124, map data, data about other object(s) in the environment, and the like) into a machine learned model trained to output the probabilit(ies) that an object is in the predicted occluded region 122.

For the purposes of illustration, a color (or degree of darkness) of a cell of the probabilit(ies) 130 can represent a probability associated with the cell that an object may be located in that cell at a time associated with the probabilit(ies) 130. For example, a white color may illustrate a low probability, a light gray color may illustrate a low probability, a dark gray color may illustrate a medium probability, and a black color may illustrate a high probability. Of course, the example 128 is illustrative and each cell can be associated with an individual probability value. In some instances, the probabilit(ies) 130 associated with the example 128 (which may also be referred to as a discretized probability distribution 130 or a heat map 130) may collectively add up to a probability of 1.

Examples of generating one or more discretized probability distributions are discussed throughout this disclosure. Further, examples of generating one or more heat maps are discussed in U.S. patent application Ser. No. 16/151,607 titled "Trajectory Prediction on Top-Down Scenes" filed Oct. 4, 2018. Application Ser. No. 16/151,607 is herein incorporated by reference, in its entirety.

At operation 132, the process can include evaluating the candidate trajectory based at least in part on the probabilit(ies). An example 134 illustrates various metrics 136 and 138 that may be used to evaluate the candidate trajectory 108. For example, the metric 136 can represent a distance between a point associated with the predicted vehicle location 120 and a region associated with a probability of the probabilit(ies) 130. In another example, the metric 138 can represent a distance between a point associated with the candidate trajectory 108 and a region associated with a probability of the probabilit(ies) 130.

In some examples, the metric 136 may be based at least in part on a distance between the predicted vehicle location 120 and a region associated with a probability of the probabilit(ies) 130, as well as the probability associated with the region. For example, the metric 136 can represent the distance scaled by or weighted by the probability. Thus, a metric indicating a high probability (of being occupied) but that represents a greater distance between the predicted vehicle location 120 and a first region associated with a relatively high probability of the probabilit(ies) 130 may represent a greater risk than a metric associated with a lesser distance between the predicted vehicle location 120 and a second region associated with a relatively lower probability of the probabilit(ies) 130.

In some examples, the operation 132 can include aggregating or otherwise determining the metrics 136 and/or 138 for a plurality of regions associated with the probabilit(ies) 130. In some examples, the operation 132 can include determining a cost associated with the candidate trajectory 108.

In at least some examples, such a cost may include not only a sum of the portion of the probabilit(ies) 130 through which the vehicles passes, but also a relative percentage area which is occluded from view of the sensor(s). For example, if a sensor is able to (capable of) measure out to 100 m in all directions, and the sensor is occluded by an object at 50 m which takes up half of the measurement surface, a relative occlusion score of 0.625, $[(5^2+10^2)/(2*10^2)]$, though any other geometry and sensor coverage is contemplated. Of course, various weights may be assigned to either the occlusion percentage and/or the probabilities to emphasize selection based on one or the other measure. In some examples, the candidate trajectory can be evaluated to determine a likelihood of a collision associated with a candidate trajectory.

In some examples, the process can be repeated for a plurality of predicted vehicle locations along the candidate trajectory 108. In some cases, if a cost (or other metric) associated with a single predicted occluded region meets or exceeds a cost threshold (or metric threshold), the candidate trajectory can be rejected or otherwise modified to generate a modified trajectory. In some cases, costs associated with a plurality of predicted occluded regions associated with a plurality of different predicted vehicle locations along the candidate trajectory 108 can be aggregated to determine an aggregated candidate trajectory score (or aggregated metric score). Candidate trajectory scores can be determined for a variety of different candidate trajectories, and a trajectory can be selected to control a vehicle, such as an autonomous vehicle, to traverse an environment. In any such example, such costs may be compared between trajectories and/or to a threshold cost either on an instant by instant basis, or as aggregated over the entirety of the candidate trajectory 108.

FIG. 2 illustrates examples 200 of determining occluded regions based on a candidate trajectory.

An example 202 illustrates the vehicle 106 associated with the candidate trajectory 108 to traverse around the object 110 in the environment. In some cases, based at least in part on ray casting techniques (illustrated by the rays 204 and 206), an occlusion component associated with the vehicle 106 can determine an occluded region 208 associated with the object 110. In some examples, the occluded region 208 is associated with a first time $T_1$.

An example 210 illustrates the predicted vehicle location 120, the predicted object location 124, and the predicted occluded region 122 at a time $T_2$ after the first time. Thus, in some examples, the example 210 can represent a future time after a present time to evaluate the candidate trajectory 108 prior to controlling the vehicle 106 to follow the candidate trajectory 108.

An example 212 illustrates a predicted vehicle location 214 and a predicted object location 216 at a time $T_N$ after the second time. Further, the example 212 illustrates a predicted occluded region 218 based on the locations of the predicted vehicle location 214 and the predicted object location 216 at a time $T_N$.

In some examples, the times $T_1$, $T_2$, and $T_N$ may represent any times such as a present time (e.g., $T_1$), a first second in the future (e.g., $T_2$), an N-th second in the future (e.g., $T_N$), and the like. Of course, the examples 200 may reflect any period of time (e.g., 0.1 seconds, 0.2 seconds, 1 second, 2 seconds, 3 seconds, 8 seconds, and the like) and is not limited to the examples discussed herein.

As noted above, techniques for determining occluded regions and predicted occluded regions can be found, for example, in U.S. patent application Ser. No. 16/246,208 titled "Occlusion Prediction and Trajectory Evaluation" and filed Jan. 11, 2019, which is incorporated by reference herein in its entirety.

Figure 3A:
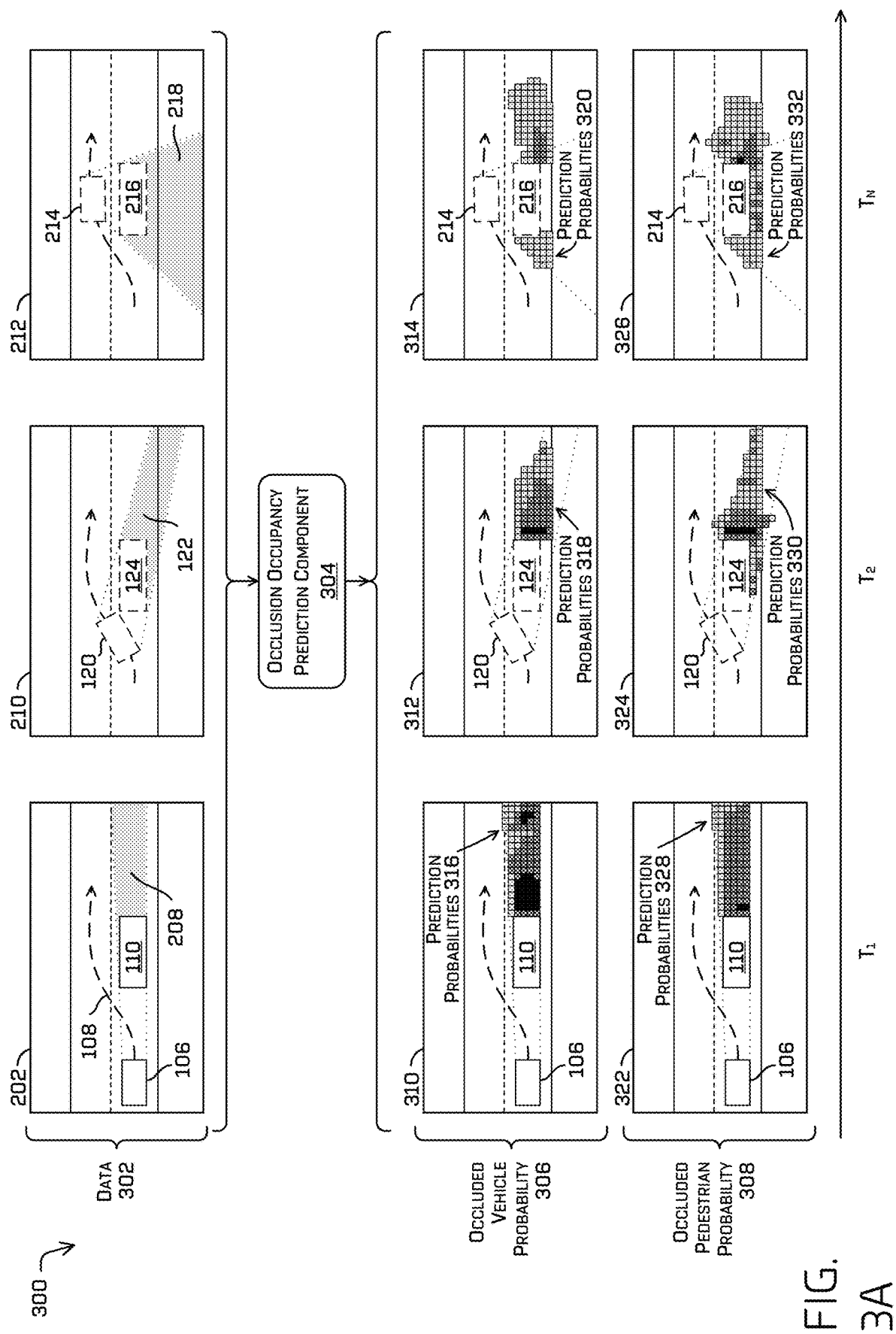
FIG. 3A illustrates an example of determining prediction probabilities associated with an occupancy of occluded region(s).

FIG. 3A illustrates an example 300 of determining prediction probabilities associated with an occupancy of occluded region(s).

In some instances, the examples 202, 210, and 212 illustrate the occluded regions 208, 122, and 218 at times $T_1$, $T_2$, and $T_N$, respectively, as determined based on the candidate trajectory 108.

Data 302 associated with the examples 202, 210, and 212 can be input to an occlusion occupancy prediction component 304. In some examples, the data 302 can comprise top-down representations of the examples 202, 210, and/or 212, which may include representations of the occluded regions 208, 122, and 218, respectively, as well as any data or predicted data about the vehicle(s), object(s), map data, and the like.

The occlusion occupancy prediction component 304 can receive the data 302 and can output an occluded vehicle probability 306 and/or an occluded pedestrian probability 308. For example, the occluded vehicle probability 306 can include data 310, 312, and 314 representing prediction probabilities 316, 318, and 320, respectively. In some instances, the prediction probabilities 316 can represent a heat map indicative of a probability or likelihood that a vehicle is occupying regions associated with the occluded region 208 at the time $T_1$. In some instances, the prediction probabilities 318 can represent a heat map indicative of a probability or likelihood that a vehicle is occupying regions associated with the occluded region 122 at the time $T_2$. In some instances, the prediction probabilities 320 can represent a heat map indicative of a probability or likelihood that a vehicle is occupying regions associated with the occluded region 218 at the time $T_N$.

In some examples, the prediction probabilities 316, 318, and/or 320 can be limited to drivable areas in the environment, which may be based at least in part on map data associated with the environment.

Figure 3B:
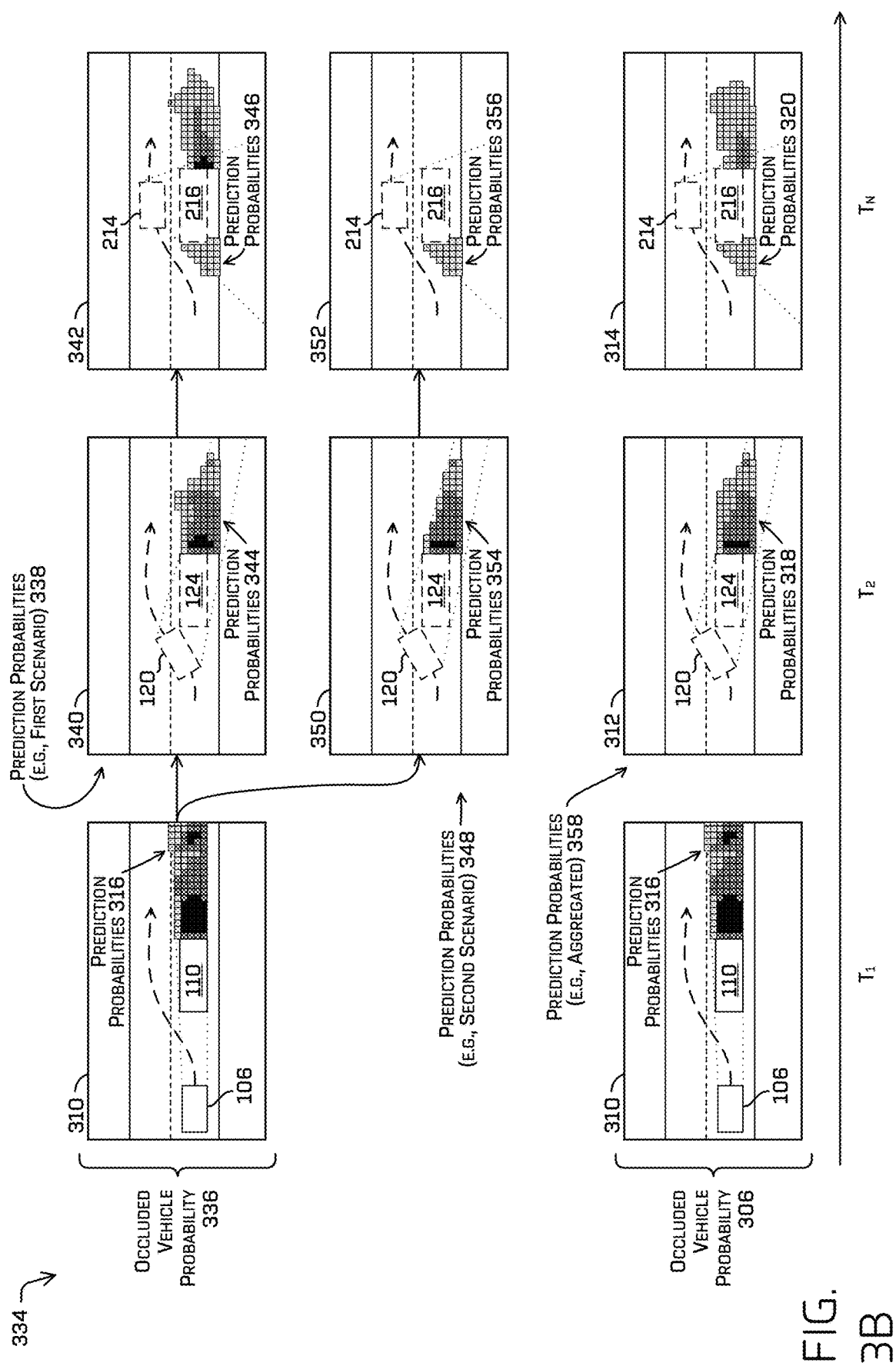
FIG. 3B illustrates an example of determining prediction probabilities associated with an occupancy of occluded region(s) for various scenarios.

In some examples, and as discussed with respect to FIG. 3B, the prediction probabilities 316, 318, and/or 320 can represent aggregated prediction probabilities associated with an aggregated or average probability associated with various scenarios (e.g., a scenario where the occluded region 208 is occupied by a vehicle and a scenario where the occluded region 208 is not occupied by a vehicle). Further, in some instances, the prediction probabilities 316, 318, and/or 320 can represent possible motion of an object if that object were to occupy a region at a particular time. This can be represented, for example, by attributes of the prediction probabilities 316, 318, and/or 320 changing over time (e.g., being evolved, simulated, or otherwise predicted over time). For example, a probability can increase, decrease, change shape (e.g., diffuse, migrate, move, etc.) based on attributes of objects in an environment.

Similarly, and for example, the occluded pedestrian probability 308 can include data 322, 324, and 326 representing prediction probabilities 328, 330, and 332, respectively. In some instances, the prediction probabilities 328 can represent a heat map indicative of a probability or likelihood that a pedestrian is occupying regions associated with the occluded region 208 at the time $T_1$. In some instances, the prediction probabilities 330 can represent a heat map indicative of a probability or likelihood that a pedestrian is occupying regions associated with the occluded region 122 at the time $T_2$. In some instances, the prediction probabilities 332 can represent a heat map indicative of a probability or likelihood that a pedestrian is occupying regions associated with the occluded region 218 at the time $T_N$.

In some examples, the prediction probabilities 328, 330, and/or 332 can be limited to drivable areas in the environment, which may be based at least in part on map data associated with the environment. In some examples, the prediction probabilities 328, 330, and/or 330 can be associated with non-drivable areas, such as a sidewalk.

Although discussed in the context of the occluded vehicle probability 306 and the occluded pedestrian probability 308, the occlusion occupancy prediction component 304 can determine probabilities associated with any classification of objects (e.g., static obstacles, dynamic objects (generally), vehicles, pedestrians, bicyclists, animals, and the like.

As discussed herein, the prediction probabilities 316, 318, 320, 328, 330, and/or 332 can be based at least in part on any number of factors. For example, the example 314 illustrates that a portion of the drivable area within the occluded region 218 is colored white, which may represent a lowest probability that a vehicle is occupying the particular region. In some examples, this may be based on a size of the occluded region (e.g., being below a threshold size to be occupied by a vehicle), as well as other factors.

In at least some examples, such machine learned models may be based on, for example, previously observed data. As a non-limiting example, as a vehicle traverses an environment, the vehicle may capture data regarding one or more static and/or dynamic objects in a scene. In such an example, previously captured of relative locations of objects in an environment (and relative to the vehicle) may associated with one or more additional objects. That is to say that previous observations about relative positions of entities in an environment may be used to train a network to provide insight into likelihoods of additional entities based on such relative locations and orientations. As a non-limiting example, there may be a general probability associated with pedestrians walking between a row of parked cars which, further, may be based at least in part on the spacing of the vehicles. Additional details of training a machine learning model are discussed with respect to FIG. 4, as well as throughout this disclosure.

FIG. 3B illustrates an example 334 of determining prediction probabilities associated with an occupancy of occluded region(s) for various scenarios.

The example 334 illustrates another implementation of determining an occluded vehicle probability 336 (e.g., similar to the occluded vehicle probability 306). However, whereas the occluded vehicle probability 306 represents aggregated prediction probabilities, the occluded vehicle probability 336 can represent prediction probabilities associated with various scenarios.

For example, prediction probabilities associated with a first scenario are illustrated as prediction probabilities 338. The prediction probabilities 338 represent predictions associated with times $T_2$ and $T_N$ where a vehicle is predicted to exist within the occluded regions, as discussed herein. For example, data 340 and 342 represent prediction probabilities 344 and 346 representing a scenario whereby a vehicle is predicted to be observed in the occluded regions 208, 122, and 218. Further, the prediction probabilities 344 and 346 can represent a probability that, if a vehicle was to be observed in the occluded regions, that such a vehicle would occupy other regions of the environment. For examples, the prediction probabilities 344 can be based at least in part on prediction motion of a vehicle if it were to occupy the occluded regions 208, 122, and/or 218.

The occluded vehicle probability 336 can further represent prediction probabilities associated with a second scenario as the prediction probabilities 348. The prediction probabilities 348 represent predictions associated with times $T_2$ and $T_N$ where a vehicle is predicted to not exist within the occluded regions, as discussed herein. For example, data 350 and 352 represent prediction probabilities 354 and 356 representing a scenario whereby no vehicle is predicted to be observed in the occluded regions 208, 122, and 218, as discussed herein. Thus, as the vehicle 106 is predicted to traverse along the candidate trajectory (e.g., illustrated as the vehicle 120 and 214), the data 350 and 352 illustrate that, as formerly occluded regions become visible, predicted probabilities associated with additional occluded regions.

Thus, the occluded vehicle probability 306 can represent the prediction probabilities 358, which may correspond to aggregated probabilities associated with the first scenario and second scenario. That is, in some instances, the occlusion occupancy prediction component 304 can output probabilities associated with occluded regions representing an aggregation or average of various possible scenarios (e.g., an object existing in an occluded region or an object not existing in an occluded region). In some instances, the occlusion occupancy prediction component 304 can output data associated with different scenarios (e.g., an object existing in an occluded region or an object not existing in an occluded region), whereby a trajectory can be evaluated in the event of either scenario.

Although FIG. 3B illustrates prediction probabilities for a first and second scenario, any number of scenarios can be determined. Further, although illustrated in the context of determining prediction probabilities for vehicle, it can be understood that scenarios can be determined for any number and type of object (e.g., vehicles, pedestrians, animals, bicyclists, etc.). In some examples, the occlusion occupancy prediction component 304 can determine aggregated prediction probabilities for a first object type and can determine scenario-based prediction probabilities for a second object type, depending on various implementations.

FIG. 4 illustrates examples 400 of attributes of object(s) in an environment.

In some instances, attributes 402 can represent a variety of information about or associated with a vehicle, an object, an occluded region, etc. in an environment.

In some examples, the attributes 402 can be determined based on log data and can be used to train a machine learning model to determine probabilities that an occluded region is occupied.

In some examples, the attributes 402 can be determined based on sensor data and/or map data and can be input to a machine learned model to determine the prediction probabilities, as discussed herein.

In some instances, the attributes 402 can be determined for one or more time instances representing an environment. An example 404 illustrates the environment at a first time $T_1$, while an example 406 illustrates the environment at a time $T_N$ after the first time.

The example 404 illustrates a vehicle 408 and an occluding object 410, as well as pedestrians 412, a crosswalk 414, and an object 416 (e.g., a traffic control device).

An occluded region 418 can be associated with the occluding object 410 and can be based at least in part on a location of the vehicle 408 along the trajectory 420 at the first time.

Further, the example 404 illustrates a pedestrian 422 within the occluded region 418, which would be not sensed by the vehicle 408 at the first time.

The example 406 illustrates the vehicle 408 traversing along the trajectory 420 to a location where the pedestrian 422 is visible to sensors associated with the vehicle 408. In some examples, the data associated with the example 406 can be used as ground truth data to indicate the known occupancy of the occluded region 418 at the time $T_1$. Further, as the vehicle 408 is at a different location a time $T_N$ compared to the location of the vehicle at time $T_1$, an occluded region 424 may be associated with the occluding object 410 at the time $T_N$.

As noted above, attributes associated with the examples 404 and/or 406 can be used to train a machine learning model to output prediction probabilities associated with an occupancy of an occluded region.

In some examples, the attribute(s) 402 may include, but are not limited to, occluding object information (e.g., a bounding box, a classification, a location, a velocity, a volume, an indication that the object is a double-parked vehicle, lighting states (e.g., brake light(s), blinker light(s), hazard light(s), headlight(s), reverse light(s), etc.), a wheel orientation of the object, etc.), occlusion information (e.g., size, shape, location, etc.), vehicle distance to the occlusion (e.g., a distance from the vehicle 408 to a point associated with the occluded region 418), object distances(s) to the occlusion (e.g., a distance of object(s) such as the objects 410, 412, 414, 416, etc. to a point associated with the occluded region 418), a trajectory distance to the occlusion (e.g., a distance between a point associated with the trajectory 420 and the occluded region 418), other object(s) information (e.g., a classification, position, velocity, acceleration, pedestrian gaze, traffic light status, and the like of any objects in the environment), a vehicle velocity (e.g., of the vehicle 408), a drivable area (e.g., lane information such as widths, speed limits, road surface type, etc.), map data (e.g., indicative of the objects 414, 416, objects (e.g., buildings, trees, etc.) in the environment), location information (e.g., a location of the environment, a global position, etc.), time (e.g., a time of day, day of the week, season, etc.), and occlusion occupancy (e.g., ground truth information indicating the pedestrian 422 is present but not visible in the occluded region 418 at the time $T_1$), and the like.

Of course, any number and type of attributes can be determined and the attributes 402 are not limited to the attributes discussed herein.

The attributes 402 can be represented as various channels of a multi-channel top-down representation of an environment and can be used as training data to train a machine learned model. For example, training data representing relevant events (e.g., attributes associated with vehicles driving through an environment comprising an occluded region) can be input to a machine learning model where a known result (e.g., a ground truth, such as the known "future" attributes/occupancy of an occluded region) can be used to adjust weights and/or parameters of the machine learning model to minimize an error.

Further, once a machine learning model has been trained to determine prediction probabilities associated with occluded regions, attributes associated with sensor data and/or map data can be determined and input to a machine learned model to determine such prediction probabilities as a vehicle traverses an environment or as a vehicle is simulated along a candidate trajectory.

Figure 5:
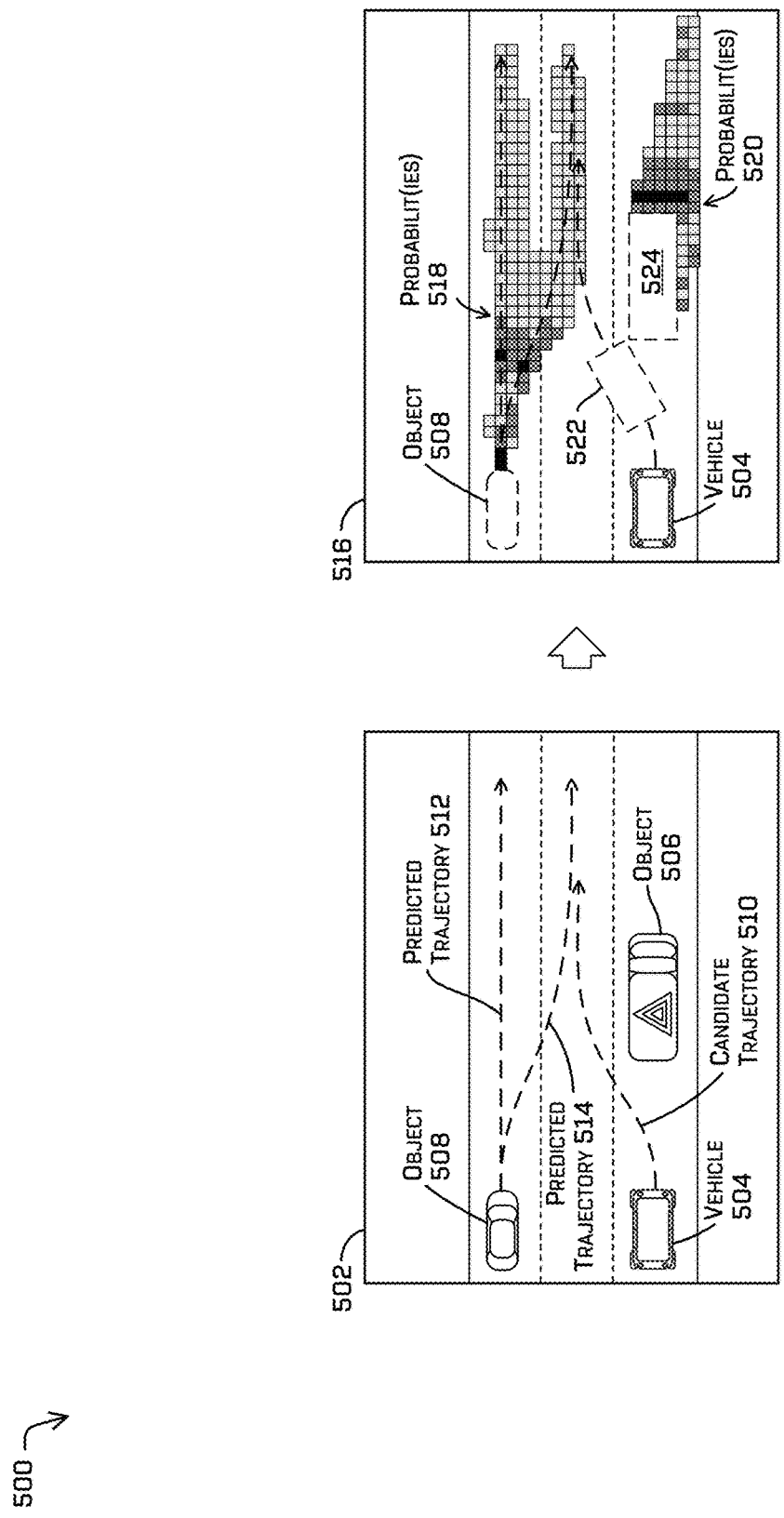
FIG. 5 illustrates an example of determining prediction probabilities associated with an object and prediction probabilities associated with an occluded region.

FIG. 5 illustrates an example 500 of determining prediction probabilities associated with an object and prediction probabilities associated with an occluded region.

An example 502 illustrates a vehicle 504 traversing an environment comprising an object 506 (e.g., a double-parked vehicle) and an object 508 (e.g., a vehicle traversing an environment. In some examples, the perception system and/or prediction system of the vehicle 504 can determine that the object 506 is a double-parked vehicle and can propose, generate, or otherwise determine a candidate trajectory 510 to traverse around the object 506.

Further, the prediction system of the vehicle 504 can determine predicted trajectories 512 and/or 514 in the environment. In some examples, the predicted trajectories can be generated by a machine learned model trained to output predicted trajectories (and/or probabilit(ies) associated with the object 508) to predict movement of the object 508 through the environment.

Examples of generating one or more predicted trajectories are discussed in U.S. patent application Ser. No. 16/151,607 titled "Trajectory Prediction on Top-Down Scenes" filed Oct. 4, 2018 and U.S. patent application Ser. No. 16/206,877 titled "Probabilistic Risk Assessment for Trajectory Evaluation" filed Nov. 30, 2018. Application Ser. Nos. 16/151,607 and 16/206,877 are herein incorporated by reference, in their entirety.

An example 516 illustrates probabilit(ies) 518 and 520 as determined by a prediction component of the vehicle 504, as discussed herein. In some examples, the probabilit(ies) 518 can represent the predicted trajectories 512 and 514, such that a probability of a cell of a heat map represents a probability that the vehicle 508 will occupy that cell at a time in the future. The probabilit(ies) 520 can represent or can be associated with a heat map, such that probability of a cell of the heat map represents a probability that an object is occupying that cell within an occluded region associated with a predicted vehicle location 522 and a predicted object location 524.

In some examples, attributes associated with the objects 506 and 508 (e.g., movement data, occluded region data, etc.) can be input as a single channel to a machine learned model trained to determine probabilities associated with visible and occluded objects.

In some examples, attributes associated with the object 506 (e.g., the occluded region data) can be associated with a first channel and attributes associated with the object 508 can be associated with a second channel that is different than the first channel, whereby the first and second channels can be input to a machine learned model trained to determine probabilities associated with visible and occluded objects.

Although the example 516 illustrates the probabilit(ies) 518 and 520 in a same example, a machine learned model can output the probabilit(ies) 518 and 520 in a same or different output data structure (e.g., in a same heat map or in separate heat maps).

Figure 6:
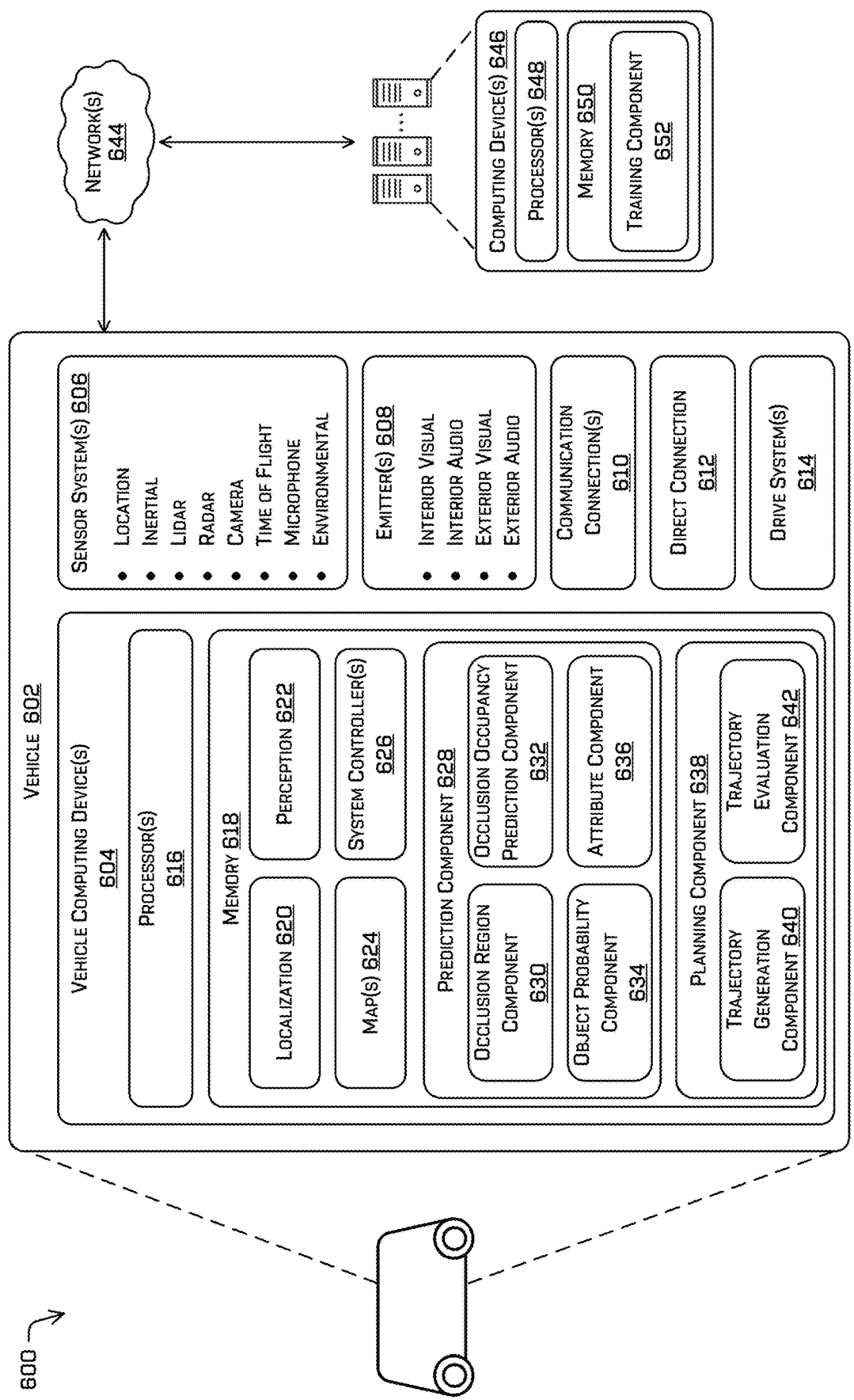
FIG. 6 depicts a block diagram of an example system for implementing the techniques described herein.

FIG. 6 depicts a block diagram of an example system 600 for implementing the techniques described herein. In at least one example, the system 600 can include a vehicle 602, which can correspond to the vehicle 106 of FIG. 1, the vehicle 408 of FIG. 4, and/or the vehicle 504 of FIG. 5.

The example vehicle 602 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 602 can include vehicle computing device(s) 604, one or more sensor systems 606, one or more emitters 608, one or more communication connections 610, at least one direct connection 612, and one or more drive systems 614.

The vehicle computing device(s) 604 can include one or more processors 616 and memory 618 communicatively coupled with the one or more processors 616. In the illustrated example, the vehicle 602 is an autonomous vehicle; however, the vehicle 602 could be any other type of vehicle or robotic platform. In the illustrated example, the memory 618 of the vehicle computing device(s) 604 stores a localization component 620, a perception component 622, one or more maps 624, one or more system controllers 626, a prediction component 628 comprising an occlusion region component 630, an occlusion occupancy prediction component 632, an object probability component 634, and an attribute component 636, and a planning component 638 comprising a trajectory generation component 640, and a trajectory evaluation component 642. Though depicted in FIG. 6 as residing in the memory 618 for illustrative purposes, it is contemplated that the localization component 620, the perception component 622, the one or more maps 624, the one or more system controllers 626, the prediction component 628, the occlusion region component 630, the occlusion occupancy prediction component 632, the object probability component 634, the attribute component 636, the planning component 638, the trajectory generation component 640, and the trajectory evaluation component 642 can additionally, or alternatively, be accessible to the vehicle 602 (e.g., stored on, or otherwise accessible by, memory remote from the vehicle 602).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 620 can provide data to various components of the vehicle 602 to determine an initial position of an autonomous vehicle for generating a trajectory, as discussed herein.

In some instances, and in general, the perception component 622 can include functionality to perform object detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, stoplight, stop sign, unknown, etc.). In additional or alternative examples, the perception component 622 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 618 can further include one or more maps 624 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 624 can include at least one map (e.g., images and/or a mesh).

In some examples, the vehicle 602 can be controlled based at least in part on the maps 624. That is, the maps 624 can be used in connection with the localization component 620, the perception component 622, the prediction component 628, and/or the planning component 638 to determine a location of the vehicle 602, identify objects in an environment, and/or generate routes and/or trajectories to navigate within an environment.

In some examples, the one or more maps 624 can be stored on a remote computing device(s) (such as the computing device(s) 646) accessible via network(s) 644. In some examples, multiple maps 624 can be stored based on, for example, a characteristic (e.g., type of entity, time of day, day of week, season of the year, etc.). Storing multiple maps 624 can have similar memory requirements, but can increase the speed at which data in a map can be accessed.

In at least one example, the vehicle computing device(s) 604 can include one or more system controllers 626, which can be configured to control steering, propulsion, braking, safety, emitters, communication, and other systems of the vehicle 602. These system controller(s) 626 can communicate with and/or control corresponding systems of the drive system(s) 614 and/or other components of the vehicle 602.

In general, the prediction component 628 can include functionality to generate predicted information associated with objects and/or occluded regions in an environment. In some examples, the prediction component 628 can be implemented to predict locations of occlusions in an environment based on movement of an object and/or predicted location(s) of the vehicle 602 along a candidate trajectory. In some examples, the techniques discussed herein can be implemented to predict locations of objects (e.g., a vehicle, a pedestrian, and the like) as the vehicle traverses an environment. In some examples, the prediction component 628 can generate one or more predicted trajectories for such target objects based on attributes of the target object and/or other objects proximate the target object.

The occlusion region component 630 can include functionality to determine one or more occluded regions or one or more predicted occluded regions associated with an environment. For example, the occlusion region component 630 can determine a portion of the environment (e.g., associated with an occlusion grid) to determine whether the portion is "visible" to one or more sensors of the vehicle 602." In some instances, the occlusion region component 630 can include functionality to project sensor data into map data to determine regions of the map where no data is located. In some instances, the map data can be used to determine that there are regions "outside" the observable regions to determine regions that are occluded regions. In some instances, the occlusion region component 630 can dynamically generate an occluded region based on objects in an environment. Further, in some examples, the occlusion region component 630 can determine predicted occluded regions based on predicted locations of the vehicle 602 and other object(s) in an environment (e.g., with respect to a candidate trajectory). In any one or more examples, such an occlusion region component 630 may also determine a relative percentage of coverage an area has with respect to some baseline sensor coverage.

The occlusion occupancy prediction component 632 can include functionality to determine an occupancy of an occluded region in an environment. The occlusion occupancy prediction component 632 can receive data representing an environment including an occluded region. Such data can be represented as a top-down representation of the environment, whereby attribute(s) of the vehicle 602, object(s) in the environment, the occluded region(s), and the like can be represented as image data of a multi-channel image. In some examples, the occlusion occupancy prediction component 632 can output a probability that an occluded region is occupied by an object, such as a vehicle or pedestrian. In some examples, a probability can be based at least in part on heuristic, including but not limited to, whether a size of the occluded region is below a threshold, if a distance between a vehicle and the occluded region meets or exceeds a threshold distance, if a distance between a trajectory and the occluded region meets or exceeds a threshold distance, if an occupancy of the occluded region is known (e.g., based on other sensor data), observing objects entering or exiting the occluded regions, a distance to objects in environment (e.g., other vehicle or pedestrians, a crosswalk, a building, etc.) and the like. In some examples, a probability of an occupancy of an occluded region can be represented as a discretized probability distribution, a heat map, and the like.

In some examples, the occlusion occupancy prediction component 632 is a machine learned model such as a neural network, a fully connected neural network, a convolutional neural network, a recurrent neural network, and the like.

In some examples, the occlusion occupancy prediction component 632 can be trained by reviewing data logs to determine events where occluded regions are present in an environment and where data is available to determine an occupancy of the occluded region (e.g., whether the occluded region was occupied, and if so, attributes of such object(s) occupying the occluded region). Such events can be identified and attributes can be determined for the object (e.g., a vehicle, a pedestrian, a static object, etc.) and the environment, and data representing the events can be identified as training data. The training data can be input to a machine learning model where a known result (e.g., a ground truth, such as the known "future" attributes) can be used to adjust weights and/or parameters of the machine learning model to minimize an error.

The object probability component 634 can include functionality to determine trajectories of objects in the environment, such as in real time, and can also predict future trajectories of objects. A predicted trajectory can be based on a current location of an object, along with evaluating the object over time to determine possible locations of the object based on an object classification, position, speed, acceleration, sensor uncertainty, and the like. The object probability component 634 may be configured to evaluate and/or predict multiple object trajectories with respect to multiple possible vehicle trajectories substantially simultaneously. Examples of generating one or more predicted trajectories are discussed in U.S. patent application Ser. No. 16/151,607 titled "Trajectory Prediction on Top-Down Scenes" filed Oct. 4, 2018. Application Ser. No. 16/151,607 is herein incorporated by reference, in its entirety.

In some examples, the object probability component 634 is a machine learned model such as a neural network, a fully connected neural network, a convolutional neural network, a recurrent neural network, and the like.

For example, the object probability component 634 can be trained by reviewing data logs and determining attribute information. Training data representing relevant events (e.g., vehicles driving through an environment) can be input to a machine learning model where a known result (e.g., a ground truth, such as the known "future" attributes/locations) can be used to adjust weights and/or parameters of the machine learning model to minimize an error.

The attribute component 636 can include functionality to determine attribute(s) (also referred to as attribute information) associated with objects and/or occluded region(s) in an environment. In some examples, the attribute component 636 can receive data from the perception component 622 and/or from the map(s) component 624 to determine attribute information of objects and/or occluded region(s) over time. The attribute information can be provided to the occlusion region component 630, the occlusion occupancy prediction component 632, and/or the object probability component 634 to perform the techniques described herein.

In general, the planning component 638 can determine a path for the vehicle 602 to follow to traverse the environment. For example, the planning component 638 can determine various routes and trajectories and various levels of detail. For example, the planning component 638 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 638 can generate an instruction for guiding the autonomous vehicle along at least a portion of the route from the first location to the second location. In at least one example, the planning component 638 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate.

The trajectory generation component 640 can include functionality to generate one or more trajectories for the vehicle 602 to follow to traverse through an environment. In some examples, the trajectory generation component 640 can generate various trajectories corresponding to various actions for the vehicle to perform in an environment. For example, actions can be based at least in part on map data indicating potential drivable surfaces in an environment. By way of example, the actions may include, but are not limited to a "stay in lane" action, a "lane change right" action, a "lane change right" action, a "left turn" action, a "right turn" action, a "traverse around a double-parked vehicle" action, and the like. Of course, any number and type of actions are contemplated herein.

In some examples, the trajectory generation component 640 can generate trajectories based at least in part on a centerline of a road segment. In some examples, the trajectory generation component 640 can generate a trajectory based at least in part on various costs, including but not limited to a reference cost (e.g., a cost associated with generating a trajectory at a distance away from a reference trajectory), an obstacle cost (e.g., a cost associated with a distance from a trajectory to an obstacle in the environment), a steering cost (e.g., associated with maximum steering angles), an acceleration cost (e.g., a cost associated with maximum acceleration and/or braking), and the like. Of course, the trajectory generation component 640 can generate a trajectory based on a variety of factors and is not limited to express examples discussed herein.

The trajectory evaluation component 642 can include functionality to evaluate various trajectories or candidate trajectories to select a trajectory to control the vehicle 602. In some examples, the trajectory evaluation component 642 can include functionality to determine various score(s), cost(s), metric(s), and the like based at least in part on probabilit(ies) associated with one or more occluded regions associated with a trajectory, relative occlusion percentages, and/or relative weighting therebetween. For example, a trajectory can be evaluated based at least in part on one or more of a risk with respect to an occluded region (e.g., associated with a distance between the occluded region and the vehicle, a speed of the vehicle, a relative visibility or size of an occluded region, a ratio of an size of an occluded region and a visible region in an environment, a probability of a collision associated with the trajectory, and the like) as well as respecting other goals or costs (e.g., maintaining progress towards a waypoint or destination, respecting speed limits (e.g., by not going too slow or too fast), reference cost(s), obstacle cost(s), steering cost(s), acceleration cost(s), and the like).

In some examples, an occluded region can be represented as an obstacle and a trajectory can be evaluated by determining an obstacle cost associated with the obstacle (e.g., with the prediction probabilit(ies) increasing or decreasing a weight or cost associated with the obstacle).

In some examples, and as discussed herein, a trajectory can be evaluated based at least in part on a probability of collision associated with the trajectory. For example, as a location of the vehicle 602 is evaluated over time with respect to a trajectory, an amount of overlap between a bounding box associated with the vehicle and different prediction probabilities can be determined. In some examples, an amount of overlap can be determined for discrete points and/or times along a trajectory, while in some examples, an amount of overlap can be determined for a plurality of points and/or times along a trajectory. The overlap can be integrated, summed, or otherwise aggregated to determine a probability of a collision associated with the trajectory, and the probability of a collision can be compared with other candidate trajectories to select a trajectory. In some examples, the probability of a collision can be considered as a cost in generating, modifying, or otherwise determining a trajectory for the vehicle to traverse. Examples of evaluating a trajectory are described in U.S. patent application Ser. No. 16/206,877 titled "Probabilistic Risk Assessment for Trajectory Evaluation" filed Nov. 30, 2018. Application Ser. No. 16/206,877 is herein incorporated by reference, in its entirety.

As can be understood, the components discussed herein (e.g., the localization component 620, the perception component 622, the one or more maps 624, the one or more system controllers 626, the prediction component 628, the occlusion region component 630, the occlusion occupancy prediction component 632, the object probability component 634, the attribute component 636, the planning component 638, the trajectory generation component 640, and the trajectory evaluation component 642) are described as divided for illustrative purposes. However, the operations performed by the various components can be combined or performed in any other component. Further, any of the components discussed as being implemented in software can be implemented in hardware, and vice versa. Further, any functionality implemented in the vehicle 602 can be implemented in the computing device(s) 646, or another component (and vice versa).

In at least one example, the sensor system(s) 606 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, the time of flight sensors can include individual time of flight sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device(s) 604. Additionally or alternatively, the sensor system(s) 606 can send sensor data, via the one or more network(s) 644, to the one or more computing device(s) 646 at a particular frequency, after a lapse of a predetermined period of time, in near real-time, etc.

The vehicle 602 can also include one or more emitters 608 for emitting light and/or sound, as described above. The emitters 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device(s) 604 to another computing device or a network, such as network(s) 644. For example, the communications connection(s) 610 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive systems 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include one or more sensor systems to detect conditions of the drive system(s) 614 and/or the surroundings of the vehicle 602. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 614. Furthermore, the drive system(s) 614 also include one or more communication connection(s) that enable communication by the respective drive system with one or more other local or remote computing device(s).

In at least one example, the direct connection 612 can provide a physical interface to couple the one or more drive system(s) 614 with the body of the vehicle 602. For example, the direct connection 612 can allow the transfer of energy, fluids, air, data, etc. between the drive system(s) 614 and the vehicle. In some instances, the direct connection 612 can further releasably secure the drive system(s) 614 to the body of the vehicle 602.

In at least one example, the localization component 620, the perception component 622, the one or more maps 624, the one or more system controllers 626, the prediction component 628, the occlusion region component 630, the occlusion occupancy prediction component 632, the object probability component 634, the attribute component 636, the planning component 638, the trajectory generation component 640, and the trajectory evaluation component 642 can process sensor data, as described above, and can send their respective outputs, over the one or more network(s) 644, to one or more computing device(s) 646. In at least one example, the localization component 620, the one or more maps 624, the one or more system controllers 626, the prediction component 628, the occlusion region component 630, the occlusion occupancy prediction component 632, the object probability component 634, the attribute component 636, the planning component 638, the trajectory generation component 640, and the trajectory evaluation component 642 can send their respective outputs to the one or more computing device(s) 646 at a particular frequency, after a lapse of a predetermined period of time, in near real-time, etc.

In some examples, the vehicle 602 can send sensor data to one or more computing device(s) 646 via the network(s) 644. In some examples, the vehicle 602 can send raw sensor data to the computing device(s) 646. In other examples, the vehicle 602 can send processed sensor data and/or representations of sensor data to the computing device(s) 646. In some examples, the vehicle 602 can send sensor data to the computing device(s) 646 at a particular frequency, after a lapse of a predetermined period of time, in near real-time, etc. In some cases, the vehicle 602 can send sensor data (raw or processed) to the computing device(s) 646 as one or more log files.

The computing device(s) 646 can include processor(s) 648 and a memory 650 storing a training component 652.

In some instances, the training component 652 can include functionality to train one or more models to determine prediction probabilities, as discussed herein. In some instances, the training component 652 can communicate information generated by the one or more models to the vehicle computing device(s) 604 to revise how to control the vehicle 602 in response to different situations.

For example, the training component 652 can train one or more machine learning models to generate the prediction component(s) discussed herein. In some examples, the training component 652 can include functionality to search data logs and determine attribute(s) (e.g., in any one or more reference frames) associated with object(s). Log data that corresponds to particular scenarios (e.g., a vehicle traversing an environment comprising an occluded region) can represent training data. The training data can be input to a machine learning model where a known result (e.g., a ground truth, such as the known "future" attributes, such as whether the occluded region was occupied by an object (and attributes associated with the object)) can be used to adjust weights and/or parameters of the machine learning model to minimize an error.

For instance, aspects of some or all of the components discussed herein can include any models, algorithms, and/or machine learned algorithms. For example, in some instances, the components in the memory 650 (and the memory 618, discussed above) can be implemented as a neural network. In some examples, the training component 652 can utilize a neural network to generate and/or execute one or more models to determine segmentation information from sensor data, as discussed herein.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 616 of the vehicle 602 and the processor(s) 648 of the computing device(s) 646 can be any suitable processor capable of executing instructions to process data and perform operations as described herein. By way of example and not limitation, the processor(s) 616 and 648 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 650 are examples of non-transitory computer-readable media. The memory 618 and 650 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be associated with the computing device(s) 646 and/or components of the computing device(s) 646 can be associated with the vehicle 602. That is, the vehicle 602 can perform one or more of the functions associated with the computing device(s) 646, and vice versa. Further, aspects of the prediction component 628 (and subcomponents) can be performed on any of the devices discussed herein.

Figure 7:
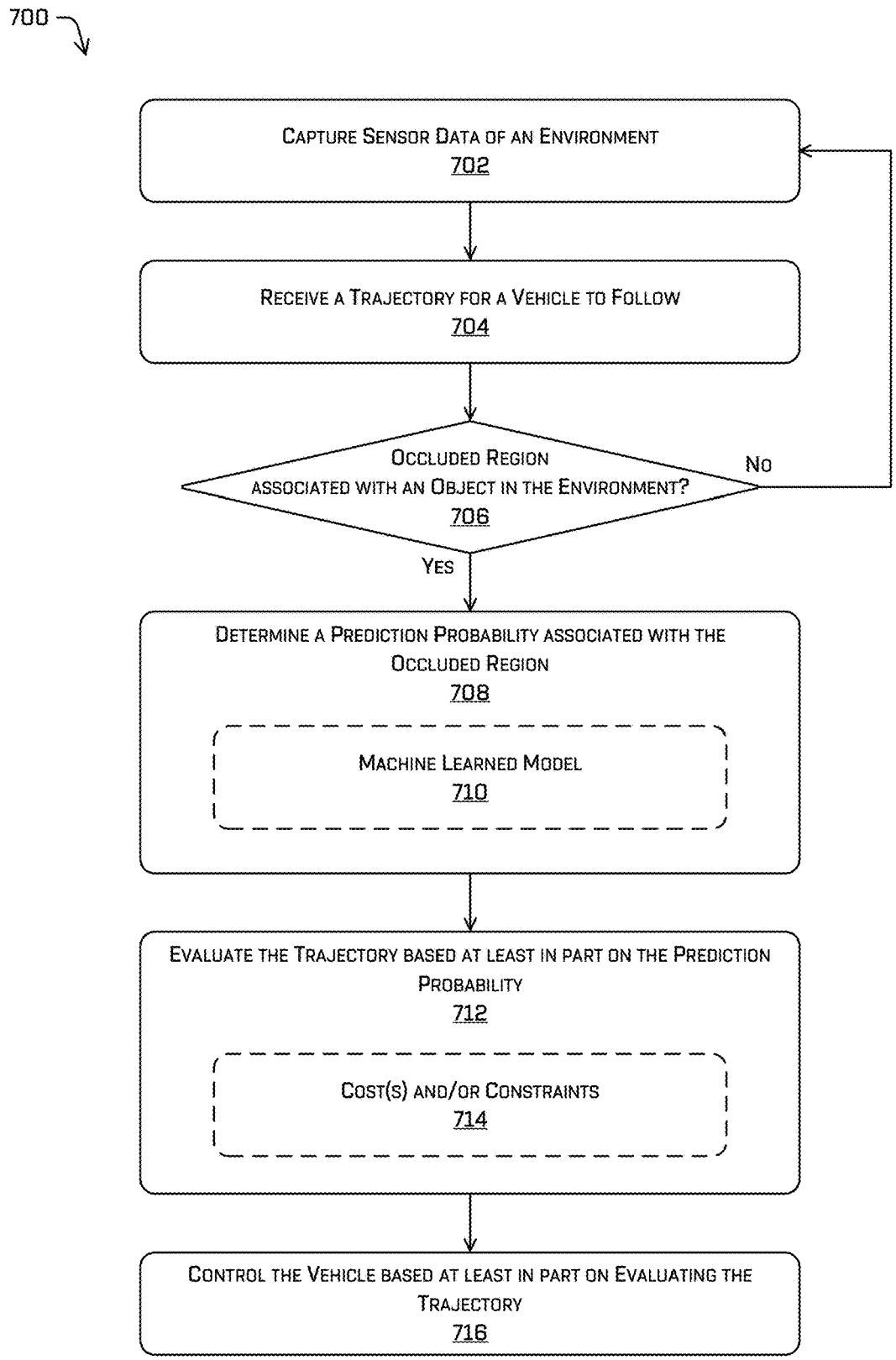
FIG. 7 depicts an example process for capturing sensor data, receiving a trajectory, determining whether an occluded region is associated with an object in an environment, determining a prediction probability, evaluating the trajectory, and controlling a vehicle based on the prediction probability.

FIG. 7 depicts an example process 700 for capturing sensor data, receiving a trajectory, determining whether an occluded region is associated with an object in an environment, determining a prediction probability, evaluating the trajectory, and controlling a vehicle based on the prediction probability. For example, some or all of the process 700 can be performed by one or more components in FIG. 6, as described herein. For example, some or all of the process 700 can be performed by the vehicle computing device(s) 604. Further, any of the operations described in the example process 700 may be executed in parallel, in a different order than depicted in the process 700, omit any of the operations of the depicted process 700, and/or be combined with any of the operations discussed herein.

At operation 702, the process can include capturing sensor data of an environment. In some examples, the operation 702 can include receiving and/or capturing time of flight data, lidar data, image data, radar data, and the like, of the environment. In some examples, the operation 702 can be performed by a vehicle (e.g., an autonomous vehicle) as the vehicle traverses the environment.

At operation 704, the process can include receiving a trajectory for a vehicle to follow. In some examples, the operation 704 can include receiving or generating a plurality of trajectories for the autonomous vehicle to follow. For examples, each trajectory can represent an individual action for the vehicle to follow based on drivable surfaces in an environment. Examples of actions include, but are not limited to, one or more of a stay in lane action, a merge left action, a merge right action, a change lane action, a right turn action, a turn left action, a stop action, and the like. In some examples, the operation 704 can include generating an exhaustive set of trajectories based on all possible (e.g., legal and physically) movements in an environment.

At operation 706, the process can include determining whether an occluded region is associated with an object in the environment. For example, the operation 706 can include determining whether an object is represented in the environment, and if so, whether an occluded region is associated with the object. In some examples, the operation 706 can include determining a predicted occluded region based at least in part on a predicted vehicle location of a vehicle along the trajectory. For example, a predicted occluded region can be based at least in part on a simulated or predicted motion of the vehicle and on a simulated or predicted motion of an object in an environment. Such predictions may include active and/or passive prediction of how entities in an environment may move given relative motion of the vehicle and may be based on machine learned models and/or physics-based models. In at least some examples, occluded regions may be determined based on ray casting, or otherwise modeling what one or more sensors on the vehicle would be exposed to at one or more updated times based on the predicted motion of the vehicle and the entit(ies).

If an occluded region is not associated with an object in the environment (and/or if an object is not present in the environment, if a size of the occluded region is below a threshold, if a distance between a vehicle and the occluded region meets or exceeds a threshold distance, if a distance between a trajectory and the occluded region meets or exceeds a threshold distance, if an occupancy of the occluded region is known, and the like) (e.g., "no" in the operation 706), the process can return to the operation 702.

If an occluded region is associated with an object in the environment (e.g., "yes" in the operation 706), the process continues to operation 708.

At operation 708, the process can include determining a prediction probability associated with the occluded region. In some examples, the operation 708 can include determining a top-down representation of an environment at a particular time. In some examples, the operation 708 can include determining a plurality of top-down representations of including predictions of vehicle and/or object locations in the environment over time. For example, the operation 708 can include determining a plurality of top-down images representing the environment in the future (e.g., at 1 second, 2 seconds, 3 seconds, 5 seconds, etc. in the future). Of course, any number of top-down representations corresponding to any period of time (whether in the past or in the future) can be determined for an environment.

Further, the operation 708 can including inputting the top-down representation(s) into a machine learned model, as indicated by operation 710. In some examples, the machine learned model is a neural network trained to determine prediction probabilities associated with occluded regions, as discussed herein.

At operation 712, the process can include evaluating the trajectory based at least in part on the prediction probability. For example, the operation 712 can include determining one or more metrics or attributes associated with the candidate trajectories, such as a physical proximity of an occluded region to the vehicle or other object(s) in an environment, a size of an occluded region, an amount of time a region has been occluded, a flux of objects entering or exiting the occluded region over a period of time, and the like.

In some examples, the operation 712 can include determining costs and/or constraints associated with the occluded region, as indicated by the operation 714. In some examples, the occluded region can be represented as an obstacle in an environment (e.g., a constraint) whereby the operation 714 can include determining an obstacle cost associated with the occluded region. In some examples, a drivable corridor (e.g., a constraint) can be based at least in part on an occluded region, whereby a cost can be determined based on the candidate trajectory relative to the corridor. Additional implementations of costs and/or constraints are considered herein. In at least some examples, such a cost may be compared to a threshold and or other proposed trajectories either at an instant in time and/or as summation over the entirety of the trajectory.

In some examples, the operation 712 can include selecting a trajectory from a plurality of candidate trajectories based at least in part on the costs and/or constraints associated with one or more occluded regions.

At operation 716, the process can include controlling a vehicle based at least in part on the evaluating the trajectory. In some instances, the operation 716 can include generating a trajectory to stop the vehicle or to otherwise control the vehicle to safely traverse the environment. In some examples, the operation 716 can include modifying a candidate trajectory based on the costs and/or constraints to determine a modified trajectory for the vehicle to follow in the environment.

Example Clauses

A. A system comprising: one or more processors; and one or more computer-readable media storing instructions executable by the one or more processors, wherein the instructions, when executed, cause the system to perform operations comprising: capturing sensor data of an environment using a sensor of an autonomous vehicle; determining, based at least in part on the sensor data, a first location of an object in the environment; receiving a candidate trajectory for the autonomous vehicle to follow; determining a second location of the autonomous vehicle along the candidate trajectory; determining, based at least in part on the sensor data, the first location, and the second location, an occluded region in the environment occluded by the object; inputting the occluded region into a machine learned model; receiving, from the machine learned model, prediction probabilities associated with an occupancy of the occluded region; determining, based at least in part on the prediction probabilities and the candidate trajectory, a cost associated with the candidate trajectory; determining that the cost is below a cost threshold; and controlling the autonomous vehicle to follow the candidate trajectory based at least in part on the cost being below the cost threshold.

B: The system of paragraph A, wherein the occluded region is a first occluded region, wherein the prediction probabilities are first prediction probabilities associated with a first time, and wherein the occupancy is a first occupancy, the operations further comprising: determining, based at least in part on the candidate trajectory, a predicted location of the autonomous vehicle in the environment at a second time after the first time; determining a predicted location associated with the object in the environment at the second time; determining, based at least in part on the predicted location of the autonomous vehicle and the predicted location of the object, a second occluded region occluded by the object; inputting the second occluded region into the machine learned model; receiving, from the machine learned model, second prediction probabilities of a second occupancy associated with the second occluded region; and determining the cost associated with the candidate trajectory based at least in part on the second prediction probabilities.

C: The system of paragraph A or B, the operations further comprising: representing the environment as top-down image data comprising the occluded region; and inputting the top-down image data to the machine learned model, wherein the prediction probabilities are based at least in part on the top-down image data.

D: The system of any of paragraphs A-C, wherein the prediction probabilities comprise a first prediction probability that the occluded region is associated with a vehicle and a second prediction probability that the occluded region is associated with a pedestrian.

E: The system of any of paragraphs A-D, wherein the cost is further based at least in part on at least one of: a first distance between the candidate trajectory and the occluded region; a second distance between the autonomous vehicle and the occluded region; a velocity of the autonomous vehicle; a percentage of visible to occluded area; a size of the occluded region; a shape of the occluded region; or a probability of a collision associated with the candidate trajectory.

F: A method comprising: capturing sensor data of an environment; determining, based at least in part on the sensor data, a location of an object in the environment; receiving a trajectory for a vehicle to follow; determining, based at least in part on the sensor data and the trajectory, an occluded region occluded by the object; determining a prediction probability associated with an occupancy of a portion of the occluded region; and evaluating the trajectory based at least in part on the prediction probability.

G: The method of paragraph F, further comprising: determining, based at least in part on the prediction probability and the trajectory, a cost associated with the trajectory; and evaluating the trajectory further based at least in part on the cost.

H: The method of paragraph G, further comprising: determining that the cost meets or exceeds a cost threshold; performing at least one of: modifying at least one aspect of the trajectory to determine a modified trajectory; or selecting another trajectory as a selected trajectory; and controlling the vehicle to follow the modified trajectory or the selected trajectory.

I: The method of any of paragraphs F-H, further comprising: representing the environment as top-down data comprising the occluded region; inputting the top-down data to a machine learned model; and receiving, from the machine learned model, the prediction probability associated with the occupancy of the portion of the occluded region.

J: The method of any of paragraphs F-I, wherein the occluded region is associated with a first time, wherein the prediction probability is a first prediction probability, and wherein the occupancy is a first occupancy, the method further comprising: determining, based at least in part on the sensor data and the trajectory, a predicted occluded region associated with the object at a second time after the first time; determining a second prediction probability associated with a second occupancy of a portion of the predicted occluded region; and evaluating the trajectory further based at least in part on the second prediction probability.

K: The method of any of paragraphs F-J, wherein the vehicle is a first vehicle, and wherein the prediction probability comprises a probability that the portion is occupied by at least one of a second vehicle or a pedestrian.

L: The method of any of paragraphs F-K, wherein the prediction probability represents a portion of a discretized probability distribution.

M: The method of any of paragraphs F-L, further comprising: controlling the vehicle based at least in part on evaluating the trajectory.

N: The method of any of paragraphs F-M, further comprising: receiving map data of the environment; and determining the occluded region based at least in part on a ray casting operation, the sensor data, and the map data.

O: The method of any of paragraphs F-N, wherein: the vehicle is an autonomous vehicle; the trajectory is a first trajectory associated with a first action; the occluded region is a first occluded region; the prediction probability is a first prediction probability; the occupancy is a first occupancy; and the method further comprises: determining, based at least in part on the sensor data and a second trajectory, a second occluded region occluded by an object in the environment; determining a second prediction probability associated with a second occupancy of a portion of the second occluded region; evaluating the second trajectory based at least in part on the second prediction probability; and controlling the vehicle further based at least in part on evaluating the second trajectory.

P: A non-transitory computer-readable medium storing instructions that, when executed, cause one or more processors to perform operations comprising: capturing sensor data of an environment; receiving a trajectory for a vehicle to follow; determining, based at least in part on the sensor data and the trajectory, an occluded region occluded by an object in the environment; determining a prediction probability associated with an occupancy of a portion of the occluded region; and evaluating the trajectory based at least in part on the prediction probability.

Q: The non-transitory computer-readable medium of paragraph P, the operations further comprising: determining, based at least in part on the prediction probability and the trajectory, a cost associated with the trajectory; and evaluating the trajectory further based at least in part on the cost.

R: The non-transitory computer-readable medium of paragraph P or Q, the operations further comprising: representing the environment as top-down data comprising the occluded region; inputting the top-down data to a machine learned model; and receiving, from the machine learned model, the prediction probability associated with the occupancy of the portion of the occluded region.

S: The non-transitory computer-readable medium of any of paragraphs P-R, wherein the occluded region is associated with a first time, wherein the prediction probability is a first prediction probability, and wherein the occupancy is a first occupancy, the operations further comprising: determining, based at least in part on the sensor data and the trajectory, a predicted occluded region occluded by the object at a second time after the first time; determining a second prediction probability associated with a second occupancy of a portion of the predicted occluded region; and evaluating the trajectory further based at least in part on the second prediction probability.

T: The non-transitory computer-readable medium of any of paragraphs P-S, wherein the vehicle is a first vehicle, and wherein the prediction probability comprises a probability that the portion is occupied by at least one of a second vehicle or a pedestrian, and wherein the operations further comprise controlling the vehicle based at least in part on evaluating the trajectory.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing instructions executable by the one or more processors, wherein the instructions, when executed, cause the system to perform operations comprising:
   capturing sensor data of an environment using a sensor of an autonomous vehicle;
   determining, based at least in part on the sensor data, a first location of an object in the environment;
   receiving a candidate trajectory for the autonomous vehicle to follow;
   determining a second location of the autonomous vehicle along the candidate trajectory;
   determining, based at least in part on the sensor data, the first location, and the second location, an occluded region in the environment occluded by the object;
   representing the environment as top-down data comprising the occluded region;
   inputting the top-down data into a machine learned model;
   receiving, from the machine learned model, prediction probabilities associated with an occupancy of the occluded region;
   determining, based at least in part on the prediction probabilities and the candidate trajectory, a cost associated with the candidate trajectory;
   determining that the cost is below a cost threshold; and
   controlling the autonomous vehicle to follow the candidate trajectory based at least in part on the cost being below the cost threshold.

2. The system of claim 1, wherein the occluded region is a first occluded region, wherein the prediction probabilities are first prediction probabilities associated with a first time, and wherein the occupancy is a first occupancy, the operations further comprising:
   determining, based at least in part on the candidate trajectory, a predicted location of the autonomous vehicle in the environment at a second time after the first time;
   determining a predicted location associated with the object in the environment at the second time;
   determining, based at least in part on the predicted location of the autonomous vehicle and the predicted location of the object, a second occluded region occluded by the object;
   inputting the second occluded region into the machine learned model;
   receiving, from the machine learned model, second prediction probabilities of a second occupancy associated with the second occluded region; and
   determining the cost associated with the candidate trajectory based at least in part on the second prediction probabilities.

3. The system of claim 1, wherein the prediction probabilities are based at least in part on the top-down data.

4. The system of claim 1, wherein the prediction probabilities comprise a first prediction probability that the occluded region is associated with a vehicle and a second prediction probability that the occluded region is associated with a pedestrian.

5. The system of claim 1, wherein the cost is further based at least in part on at least one of:
   a first distance between the candidate trajectory and the occluded region;
   a second distance between the autonomous vehicle and the occluded region;
   a velocity of the autonomous vehicle;
   a percentage of visible to occluded area;
   a size of the occluded region;
   a shape of the occluded region; or
   a probability of a collision associated with the candidate trajectory.

6. A method comprising:
   capturing sensor data of an environment;
   determining, based at least in part on the sensor data, a location of an object in the environment;
   receiving a trajectory for a vehicle to follow;
   determining, based at least in part on the sensor data and the trajectory, an occluded region occluded by the object;
   representing the environment as top-down data comprising the occluded region;
   inputting the top-down data to a machine learned model;
   receiving, from the machine learned model, a prediction probability associated with an occupancy of a portion of the occluded region; and evaluating the trajectory based at least in part on the prediction probability.

7. The method of claim 6, further comprising:
determining, based at least in part on the prediction probability and the trajectory, a cost associated with the trajectory; and
evaluating the trajectory further based at least in part on the cost.

8. The method of claim 7, further comprising:
determining that the cost meets or exceeds a cost threshold;
performing at least one of:
   modifying at least one aspect of the trajectory to determine a modified trajectory; or
   selecting another trajectory as a selected trajectory; and
controlling the vehicle to follow the modified trajectory or the selected trajectory.

9. The method of claim 6, wherein the occluded region is associated with a first time, wherein the prediction probability is a first prediction probability, and wherein the occupancy is a first occupancy, the method further comprising:
determining, based at least in part on the sensor data and the trajectory, a predicted occluded region associated with the object at a second time after the first time;
determining a second prediction probability associated with a second occupancy of a portion of the predicted occluded region; and
evaluating the trajectory further based at least in part on the second prediction probability.

10. The method of claim 6, wherein the vehicle is a first vehicle, and wherein the prediction probability comprises a probability that the portion is occupied by at least one of a second vehicle or a pedestrian.

11. The method of claim 6, wherein the prediction probability represents a portion of a discretized probability distribution.

12. The method of claim 6, further comprising:
controlling the vehicle based at least in part on evaluating the trajectory.

13. The method of claim 6, further comprising:
receiving map data of the environment; and
determining the occluded region based at least in part on a ray casting operation, the sensor data, and the map data.

14. The method of claim 6, wherein:
the vehicle is an autonomous vehicle;
the trajectory is a first trajectory associated with a first action;
the occluded region is a first occluded region;
the prediction probability is a first prediction probability;
the occupancy is a first occupancy; and
the method further comprises:
   determining, based at least in part on the sensor data and a second trajectory, a second occluded region occluded by an object in the environment;
   determining a second prediction probability associated with a second occupancy of a portion of the second occluded region;
   evaluating the second trajectory based at least in part on the second prediction probability; and
   controlling the vehicle further based at least in part on evaluating the second trajectory.

15. A non-transitory computer-readable medium storing instructions that, when executed, cause one or more processors to perform operations comprising:
capturing sensor data of an environment;
receiving a trajectory for a vehicle to follow;
determining, based at least in part on the sensor data and the trajectory, an occluded region occluded by an object in the environment;
representing the environment as top-down data comprising the occluded region;
inputting the top-down data to a machine learned model;
receiving, from the machine learned model, a prediction probability associated with an occupancy of a portion of the occluded region; and
evaluating the trajectory based at least in part on the prediction probability.

16. The non-transitory computer-readable medium of claim 15, the operations further comprising:
determining, based at least in part on the prediction probability and the trajectory, a cost associated with the trajectory; and
evaluating the trajectory further based at least in part on the cost.

17. The non-transitory computer-readable medium of claim 15, wherein the occluded region is associated with a first time, wherein the prediction probability is a first prediction probability, and wherein the occupancy is a first occupancy, the operations further comprising:
determining, based at least in part on the sensor data and the trajectory, a predicted occluded region occluded by the object at a second time after the first time;
determining a second prediction probability associated with a second occupancy of a portion of the predicted occluded region; and
evaluating the trajectory further based at least in part on the second prediction probability.

18. The non-transitory computer-readable medium of claim 15, wherein the vehicle is a first vehicle, and wherein the prediction probability comprises a probability that the portion is occupied by at least one of a second vehicle or a pedestrian, and wherein the operations further comprise controlling the vehicle based at least in part on evaluating the trajectory.

* * * * *